US011167940B2

(12) United States Patent
Irrenhauser et al.

(10) Patent No.: US 11,167,940 B2
(45) Date of Patent: Nov. 9, 2021

(54) DEPALLETIZING DEVICE FOR DEPALLETIZING A TRANSPORT RECEPTACLE FROM A STORAGE SURFACE

(71) Applicant: Bayerische Motoren Werke Aktiengesellschaft, Munich (DE)

(72) Inventors: Thomas Irrenhauser, Munich (DE); Christian Poss, Munich (DE); Mario Trautner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/726,642

(22) Filed: Dec. 24, 2019

(65) Prior Publication Data

US 2020/0130959 A1    Apr. 30, 2020

Related U.S. Application Data

(63) Continuation of application No. PCT/EP2018/062746, filed on May 16, 2018.

(30) Foreign Application Priority Data

Jun. 28, 2017 (DE) .................... 10 2017 210 865.7

(51) Int. Cl.
*B65G 59/04* (2006.01)
*B65G 17/24* (2006.01)
*B65G 61/00* (2006.01)

(52) U.S. Cl.
CPC ............. *B65G 59/04* (2013.01); *B65G 17/24* (2013.01); *B65G 61/00* (2013.01); *B65G 2203/041* (2013.01)

(58) Field of Classification Search
CPC ........ B65G 59/04; B65G 17/24; B65G 61/00; B65G 2203/041; B65G 67/02; B65G 67/08; B65G 1/0435; B65G 1/0407; B66F 9/07

See application file for complete search history.

(56) References Cited

U.S. PATENT DOCUMENTS 3,666,127 A    5/1972  Guyaux
4,082,194 A *  4/1978  Sheehan ................ B65G 57/22
                                                        414/792

(Continued)

FOREIGN PATENT DOCUMENTS

CN    101903269 A    12/2010
CN    103261028 A     8/2013

(Continued)

OTHER PUBLICATIONS

PCT/EP2018/062746, International Search Report dated Aug. 23, 2018 (Three (3) pages).

(Continued)

*Primary Examiner* — Gregory W Adams
(74) *Attorney, Agent, or Firm* — Crowell & Moring LLP

(57) ABSTRACT

A depalletizing device for depalletizing a transport container from a storage surface includes a frame, a belt conveyor unit, a drive unit, and a plurality of balls. The belt conveyor unit is disposed so as to be height-adjustable on the frame by the drive unit and the plurality of balls are integrated in and protrude from the belt conveyor unit, are rotatable by the drive unit, and form a bearing face for the transport container.

8 Claims, 2 Drawing Sheets

(56) References Cited

U.S. PATENT DOCUMENTS

| | | | | |
|---|---|---|---|---|
| 4,271,755 | A * | 6/1981 | Kintgen | B65G 57/245 100/52 |
| 5,238,099 | A * | 8/1993 | Schroeder | B65G 13/07 198/456 |
| 5,240,102 | A | 8/1993 | Lucas | |
| 5,653,574 | A * | 8/1997 | Lin | B65H 33/08 414/791.5 |
| 5,921,740 | A * | 7/1999 | Stewart | B65G 67/08 414/398 |
| 7,857,118 | B2 * | 12/2010 | Jans | B65G 17/24 198/411 |
| 8,684,652 | B2 * | 4/2014 | Byrne | B65G 57/112 414/398 |
| 8,899,407 | B2 * | 12/2014 | Harrington | B65H 9/16 198/779 |
| 2008/0019819 | A1 * | 1/2008 | Reed | B65G 57/303 414/791.6 |
| 2010/0023159 | A1 * | 1/2010 | Mueller | B65G 57/03 700/217 |
| 2010/0092272 | A1 * | 4/2010 | Echelmeyer | B65G 61/00 414/591 |
| 2012/0031732 | A1 | 2/2012 | Harrington | |
| 2015/0344225 | A1 * | 12/2015 | Nakamura | B65G 1/0435 414/273 |
| 2016/0137435 | A1 * | 5/2016 | Tanaka | B25J 15/0014 414/564 |
| 2016/0347558 | A1 * | 12/2016 | Eto | B65G 59/04 |
| 2017/0066592 | A1 * | 3/2017 | Bastian, II | B25J 9/0096 |
| 2017/0137236 | A1 | 5/2017 | Sonoura et al. | |

FOREIGN PATENT DOCUMENTS

| | | |
|---|---|---|
| CN | 105492345 A | 4/2016 |
| DE | 2 130 968 A1 | 12/1971 |
| DE | 692 05 309 T2 | 4/1996 |
| DE | 10 2004 033 437 A1 | 10/2005 |
| DE | 10 2009 040 951 A1 | 6/2011 |
| DE | 10 2016 008 078 A1 | 1/2018 |
| EP | 2 096 054 A1 | 9/2009 |
| EP | 2 411 305 B1 | 2/2012 |
| EP | 2 636 620 A1 | 9/2013 |
| EP | 2 805 903 A1 | 11/2014 |
| JP | 9-118311 A | 5/1997 |
| WO | WO 2015/028019 A1 | 3/2015 |

OTHER PUBLICATIONS

German-language German Office Action issued in German counterpart application No. 10 2017 210 865.7 dated Jun. 26, 2018 (Seven (7) pages).

Chinese Office Action issued in Chinese application No. 201880024449.8 dated Jul. 21, 2020 (Seven (7) pages).

English-language Chinese Office Action issued in Chinese application No. 201880024449.8 dated Feb. 22, 2021 (Eight (8) pages).

* cited by examiner

DEPALLETIZING DEVICE FOR DEPALLETIZING A TRANSPORT RECEPTACLE FROM A STORAGE SURFACE

CROSS REFERENCE TO RELATED APPLICATIONS

This application is a continuation of PCT International Application No. PCT/EP2018/062746, filed May 16, 2018, which claims priority under 35 U.S.C. § 119 from German Patent Application No. 10 2017 210 865.7, filed Jun. 28, 2017, the entire disclosures of which are herein expressly incorporated by reference.

BACKGROUND AND SUMMARY OF THE INVENTION

The invention relates to a depalletizing device for depalletizing a transport container from a storage surface, and to a method for operating such a depalletizing device.

DE 692 05 309 T2 discloses a table having driveable balls that run in the rectangular manner for sorting flat items in an orthogonal manner, wherein the items are supported by the balls and are movable on the table by virtue of a movement of the balls.

EP 2 411 305 B1 discloses a deflection conveyor system having a modular belt, a multiplicity of balls, and a multiplicity of cylindrical rollers. The balls are disposed in the belt such that the balls protrude from the belt on both sides of the belt. The balls are drivable by means of the cylindrical rollers while the balls by means of the modular belt are moved relative to the drivable rollers. An item placed on the balls can be rotated and/or moved in a translatory manner.

Furthermore, it is known from the general prior art, in particular from the logistics sector, for robots to often be used for depalletizing, the robots usually being stationary. In the case of the devices described at the outset and of the robots it is disadvantageous that human operators have to keep a safe distance from the devices or the robots, respectively, by virtue of the risk of injury. This means that a particularly high space requirement is needed for depalletizing.

In the case of robots it is particularly disadvantageous that the latter by virtue of complex and frequent maintenance as well as particularly high investment costs require a particularly intensive input of financial means.

It is an object of the present invention to provide a particularly space-saving and flexible depalletizing device for depalletizing transport containers. It is furthermore an object of the invention to provide a method for operating such a particularly space-saving and flexible depalletizing device.

Advantages and advantageous design embodiments of the depalletizing device according to the invention are to be considered as advantages and advantageous refinements of the method according to the invention for operating such a depalletizing device, and vice versa.

According to the invention, a depalletizing device for depalletizing a transport container from a storage surface, having a belt conveyor unit which by means of a drive unit is disposed so as to be height-adjustable on a frame of the depalletizing device, and a plurality of balls which are integrated in and protrude from the belt conveyor unit and which are rotatable by means of the drive unit and form a bearing face for the transport container. A storage surface is to be understood to be a surface of a specific size which is formed by an upper side of a transport platform. For example, the storage surface can be the upper side of a pallet of a load bed that is disposed on a chassis of the vehicle.

The transport container can be a crate which is open toward the top and which is capable of being placed on the storage surface. The transport container can in particular have a connecting base such that a plurality of the load carriers can be stacked on top of one another in a form-fitting manner. Depalletizing the transport container from the storage surface means that the transport container sitting on the storage surface or on a further transport container is unloaded from the storage surface, or from the further transport container, respectively.

The belt conveyor unit which by means of the drive unit is height-adjustable in such a manner that the belt conveyor unit can be set to a multiplicity of operating heights is disposed on the frame of the depalletizing device. This is advantageous to the extent that the depalletizing device on account thereof can be set to mutually dissimilar heights, for example so as to be able to depalletize or unload, respectively, a plurality of layers of transport containers from the storage surface in a particularly efficient manner.

The balls that are in particular integrated in a belt webbing of the belt conveyor unit protrude from the belt conveyor unit in particular on an upper side of the belt conveyor unit, on account of which the bearing face on which the transport container can be placed is formed by the balls. In that the balls are rotatable by means of the drive unit and the belt webbing of the belt conveyor unit is also drivable by means of the drive unit, the transport container deposited on the bearing face is movable in relation to the bearing face.

A particularly flexible depalletizing device is provided on account thereof. Since the parts of the depalletizing device are in particular disposed within the frame and are movable within the frame, the depalletizing device is also particularly space-saving.

In one advantageous embodiment of the invention it is provided that the balls by means of the drive unit are in each case rotatable about at least two axes which run so as to be mutually parallel and which run parallel to the bearing face. The two mutually parallel running axes can coincide with an upper side of the belt conveyor unit, in particular with an upper side of a conveyor belt of the belt conveyor unit. On account thereof it is possible that the transport container placed on the bearing face, that is to say the transport container placed on the balls, is movable along a plane of the bearing face in particular simultaneously in two directions that lie in the plane.

It is furthermore advantageous that a gripper unit having a gripper by means of which the transport container disposed on the storage surface is capable of being gripped and of being placed onto the belt conveyor unit is provided. In other words, the depalletizing device has a gripper unit, the grippers thereof being specified for being connected in a reversible, form-fitting and/or force-fitting manner to the transport container. On account thereof, the transport container thus reversibly connected to the gripper is capable of being unloaded from the storage surface and capable of being placed onto the bearing face by means of the gripper unit.

In one particularly preferred embodiment of the invention it is provided that the gripper is configured as a suction gripper. This means that the gripper by means of negative pressure can establish a force-fitting connection which is reversible, that is to say releasable, between the gripper and the transport container. It is advantageous herein that to this end only a smooth face on the transport container corresponding to the suction gripper is utilized for reversible force-fitting connection between the suction gripper and the transport container.

It has furthermore proven advantageous that the gripper unit comprises a gripper arm which is movable in a linear manner and on which the gripper is disposed. In other words, the gripper arm is not pivotable so that a safety zone for the depalletizing device can be particularly small or be entirely dispensed with.

In one further advantageous embodiment of the invention a camera by means of which position data of the depalletizing device relative to the storage surface is capable of being recorded is provided, wherein the depalletizing device has a control installation which, based on the position data, is specified for controlling the drive unit and/or the gripper unit. This is particularly advantageous since the depalletizing device is capable of being particularly accurately controlled when evaluating position data based on camera images. Furthermore, a particularly accurate alignment of the depalletizing device in relation to the storage surface and/or in relation to a transport container to be depalletized can be dispensed with. The storage surface can be placed in an operating region of the depalletizing device, wherein a longitudinal extent and a transverse extent of the operating region can be larger than a longitudinal extent and a transverse extent of the storage surface. In other words, any deficiency in terms of accuracy when placing the storage surface in relation to the depalletizing device is capable of being equalized by means of the control installation that evaluates the position data.

According to one further advantageous embodiment it is provided that the frame has a receptacle for a lifting device of a material handling truck so that the depalletizing device is capable of being lifted and subsequently transported by means of the material handling truck. This means that the depalletizing device is lifted, for example by means of a material handling truck that is embodied as a forklift truck, and can be moved to another location, in particular an operating site. Accordingly, it is not mandatory for the storage surface to be positioned in relation to the depalletizing device, but it is also possible for the depalletizing device to be positioned in a simple manner in relation to the storage surface. It is particularly advantageous herein that the depalletizing device is embodied so as to be particularly flexible in terms of the operating site thereof.

Alternatively or additionally, it is provided that a floor castor unit is disposed on the frame. The floor castor unit can be formed by one or a plurality of, preferably four, floor contact elements which can in each case be configured as a wheel, etc. Accordingly, it is possible for the depalletizing device to be moved to another operating site without any further auxiliary means.

The invention moreover relates to a method for operating the depalletizing device according to the invention or an advantageous embodiment of the depalletizing device according to the invention. In the method for depalletizing the transport container from the storage surface the belt conveyor units by means of the drive unit are height-adjusted and the balls that are integrated in and protrude from the belt conveyor unit are rotated. The storage surface by means of the drive unit is first set to a desired height, the height being particularly advantageous in ergonomic terms, for example. The transport container, for example by means of an operator, is then lifted from the storage surface and placed onto the bearing face of the depalletizing device. The transport container which is placed on the bearing face and accordingly is in contact with a specific number of balls is moved in a translatory manner and/or rotated by means of the balls protruding on the belt conveyor unit.

Further features of the invention are derived from the claims, the figures, and the description of the figures. The features and combinations of features mentioned above in the description as well as the features and combinations of features mentioned in the description of the figures hereunder and/or shown individually in the figures, can be used not only in the respective combination stated but also in other combinations or individually.

The invention will now be explained in more detail by means of the preferred exemplary embodiment and with reference to the drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
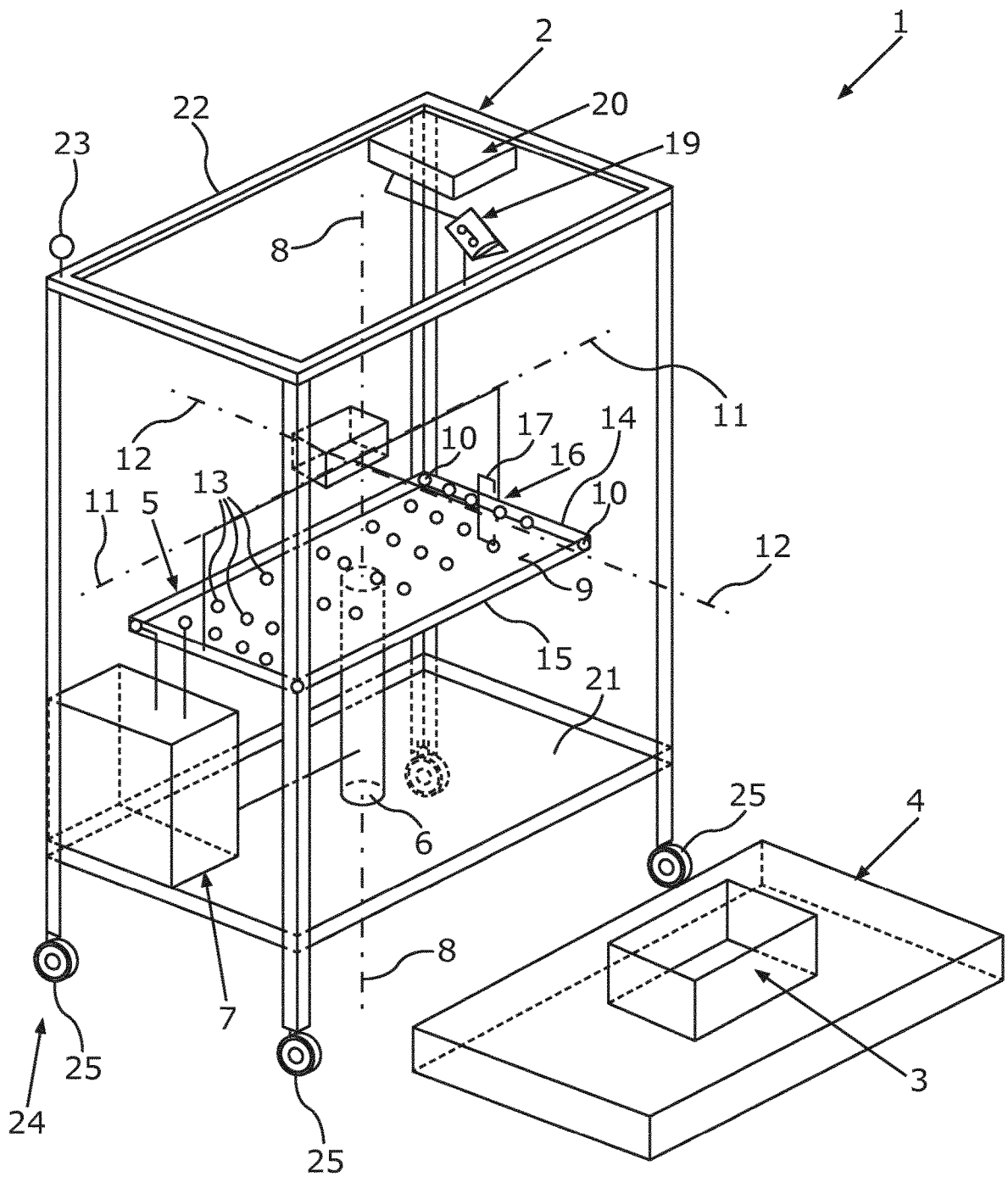
FIG. 1 shows a schematic perspective view of a depalletizing device.

FIG. 1 in a schematic perspective view shows a depalletizing device 1 which has a frame 2. A belt conveyor unit 5 which is height-adjustable is disposed on the frame 2. For example, the belt conveyor unit 5 can be disposed on the frame 2 by way of a height-adjustment installation 6. For example, the height-adjustment installation 6 can be embodied as a lifting mechanism that is drivable by means of a drive unit 7. The height-adjustment installation 6 can be, for example, a hydraulically and/or pneumatically drivable lifting cylinder, wherein a hydraulic pressure and/or pneumatic pressure to be applied for moving the lifting cylinder can be provided by means of the drive unit 7. The drive unit 7 can furthermore have a motor, the belt conveyor unit 5 by means of the mechanical work of the motor being height-adjustable by way of the height-adjustment installation 6. The belt conveyor unit 5 is in particular adjustable along a vertical axis 8 of the depalletizing device 1, or parallel to the vertical axis 8, respectively.

The belt conveyor unit 5 has a conveyor belt 9 which is held under tension by at least two rollers 10. The rollers 10 herein run parallel to a transverse axis 11 of the depalletizing device 1. In other words, the rollers 10 run transversely to a longitudinal axis 12 of the depalletizing device 1. The conveyor belt 9 can be formed by a plurality of segments (not illustrated) that are connected to one another in an articulated manner.

The belt conveyor unit 5 has a plurality of balls 13 which protrude from the belt conveyor unit 5. The balls 13 can in particular be integrated in the conveyor belt 9 so as to be locationally fixed yet nevertheless movable, that is to say rotatable. Accordingly, the balls 13 can protrude from an upper lead 14 and from a lower lead 15. This means that the balls 13 are movable in the same direction in which the conveyor belt 9 is movable. In a movement of the conveyor belt 9, the center of the respective balls is thus moved in a translatory manner conjointly with the conveyor belt 9.

The belt conveyor unit 5, in particular the conveyor belt 9 thereof, is drivable by means of the drive unit 7. For example, the drive unit 7 can comprise a further motor which is mechanically connected to one of the rollers 10 such that the roller 10 that is connected to the further motor is rotatable by means of the further motor. Since the conveyor belt 9 is held under tension by means of the rollers 10, the conveyor belt 9 contacts the rollers 10 in a friction-fitting manner. In that the rollers are rotatable by means of the drive unit 7, the conveyor belt 9 of the belt conveyor unit 5 is accordingly drivable by means of the drive unit 7.

The balls 13 that are integrated in the belt conveyor unit 5 are likewise rotatable by means of the drive unit 7, in particular by means of a third motor. It is thus conceivable that the drive unit 7 is formed by three motors. Each of the three motors herein can meet a dedicated purpose. In this case, the belt conveyor unit 5 can be height-adjustable by means of the motor, the conveyor belt 9 can be drivable by way of the rollers 10 by means of the further motor, and the balls 13 can be drivable by means of the third motor. However, it is also conceivable that the drive unit 7 is formed by a single motor, the motion work of the motor being fed to the height-adjustment installation 6, the rollers 10, and/or the balls 13 by way of a gearbox assembly and/or a switchover assembly, for example.

For example, the balls can be rotatable by means of the drive unit 7 such that the rotating direction of the balls runs parallel to a plane formed by the vertical axis 8 and the transverse axis 11. In other words, the rotating direction of the balls 13 can run perpendicularly to a movement direction of the conveyor belt 9. In yet again other words, the respective centers of the balls 13 can in each case coincide with a first rotation axis and a second rotation axis which lie in a mutually parallel manner. The first and the second rotation axis can run parallel to the bearing face, in particular parallel to the upper lead 14 and/or to the lower lead 15 of the conveyor belt 9. The balls 13 can be rotatable about the rotation axes. The balls 13 can moreover be rotatable about a third, vertical rotation axis that runs perpendicularly to the first and to the second rotation axis. It is thus guaranteed that a rotating movement of the transport container 3, sitting on the balls is in any case enabled about the vertical axis of the transport container 3. The balls 13 by means of the drive unit 7 can be rotatable in two directions. This means that the balls 13 by means of the drive unit 7 can in particular simultaneously be imparted a first rotation about the first rotation axis and a second rotation about the second rotation axis. It is particularly advantageous when the respective balls 13 by means of the drive unit 7 are in each case rotatable in a mutually independent manner perpendicularly about the two rotation axes. The transport container 3 by means of the depalletizing device 1 is thus rotatable in relation to the vertical axis of the transport container 3 when required such that it can be specified which position the transport container 3 assumes on the bearing face.

The balls 13 protruding from the belt conveyor unit 5 form a bearing face on the upper lead 14 of the conveyor belt 9, the transport container 3 being capable of being placed on the bearing face. In other words, an external base of the transport container 3 can be brought in direct contact with the multiplicity of balls 13. This results in that the transport container 3 by means of a translatory movement of the conveyor belt 9 is movable in a translatory manner, that is to say parallel to the longitudinal axis 12 of the depalletizing device 1. Alternatively or additionally, the transport container 3 by means of the rotation is movable transversely to the longitudinal axis 12 in a translatory manner parallel to the transverse axis 11 of the depalletizing device 1. On account thereof, it is possible that the transport container 3 is movable along a curve in the depalletizing device 1.

As has been described to this point, the depalletizing device 1 can be used such that the transport container 3 by means of an operator or a further device, for example a crane, a robot, etc., can be placed from the storage surface 4 on the bearing face. In the case of a particularly preferred embodiment, the depalletizing device 1 has a gripper unit 16 which comprises a gripper 17. The gripper unit 16 can unload the transport container 3 from the storage surface 4 in particular in an automatic or automated manner, respectively, without any further device that is different from the depalletizing device 1. This means that any input of an operator for depalletizing the transport container can be avoided.

The gripper unit 16 can in particular be disposed along the vertical axis 8 at a fixed spacing from the belt conveyor unit 5, or from the conveyor belt 9, respectively. This means that the gripper unit 16 is height-adjustable in that the belt conveyor unit 5 is height-adjustable. However, it is also conceivable that the gripper unit 16 is adjustable in relation to the belt conveyor unit 5, in particular parallel to the vertical axis 8, the transverse axis 11, and/or the longitudinal axis 12.

The gripper 17 is specified for gripping the transport container 3 disposed on the storage surface 4 and to place the transport container 3 onto the belt conveyor unit. To this end, the gripper 17 can have a shape which corresponds to a shape of the transport container 3, for example an external contour of the transport container 3, so as to be able to grip the transport container 3 in the form-fitting and/or force-fitting manner, for example. It is particularly preferable for the gripper 17 to be configured as a suction gripper. This means that a negative pressure can be generated between the suction gripper and an ideally smooth face of the transport container 3 that in a corresponding manner communicates with the suction gripper, on account of which the transport container 3 is capable of being connected in a primarily force-fitting and releasable, thus reversible, manner with the suction gripper.

It is furthermore conceivable that the gripper unit 16 has a gripper arm 18 which is movable in a linear manner, on account of which the transport container 3, when the latter is reversibly connected to the gripper 17, is movable in a linear manner, that is to say parallel, to the longitudinal axis 12. It is thus possible for the transport container 3 by means of the gripper unit 16 to be reversibly connected to the latter in a particularly simple manner and be placed onto the bearing face.

The gripper unit 16 can furthermore be movable parallel to the transverse axis 11. In conjunction with the height-adjustable belt conveyor unit 5 this leads to the transport container 3 placed on the storage surface 4 being capable of being reached by means of the gripper 17, independently of the position of the transport container 3 on the storage surface 4. A further consequent thereof is that depalletizing the transport container 3, that is to say unloading the transport container 3, from the storage surface 4 can take place in an automated or automatic manner, respectively, since an intervention by an operator is not required.

On account of a region in which moving parts of the depalletizing device 1 can be situated being unambiguously delimited by the frame 2 in conjunction with the external dimensions of the storage surface 4, it is not necessary for a safety zone that goes beyond the region to be established in order to avoid risk of injury to operators. In order for occupational safety to be even further increased in a direct environment of the depalletizing device 1, sides of the frame 2 can be entirely or partially covered by means of panels, for example. It is thus effectively prevented that an operator inadvertently reaches into the operating region of the depalletizing device 1 and is injured herein.

The depalletizing device 1 can furthermore have a camera 19, the camera image thereof being capable of being received by a control installation 20. This means that the camera 19 can be connected to the control installation 20 in wireless and/or wired manner such that the camera image can be fed to the control installation 20 by means of the camera 19. The control installation 20 is specified for evaluating the camera image in terms of how the depalletizing device 1 is positioned relative to the storage surface 4. In other words, the control installation 20, based on the camera image, is specified for generating and/or storing position data. Furthermore, the control installation 20, based on the position data, is specified for controlling the drive unit 7 and/or the gripper unit 16. It is achieved on account thereof that an in particular manual alignment at maximum precision of the depalletizing device 1 in relation to the storage surface 4 or vice versa can be disposed with. Any potential shortcomings when mutually aligning the depalletizing device 1 and the storage surface 4 can thus be equalized by virtue of the control of the drive unit 7 and/or of the gripper unit 16, the control being optimized by the position data.

It is also conceivable that the control installation 20 when interacting with the camera 19 evaluates the camera image in terms of how the depalletizing device 1 is positioned relative to the transport container 3. It can in particular be evaluated how the gripper 17 of the gripper unit 16 is positioned in relation to the transport container 3, for example. It is thus able to be ensured, or assured, respectively, that the gripper 17 can grip the transport container 3 in a particularly efficient and accurate manner.

The depalletizing device 1, in particular the frame 2 thereof, can have a receptacle for a lifting device of a material handling truck. For example, a lower base 21 of the depalletizing device 1 can be disposed such that the lower base 21 can be engaged from below by the prongs of a forklift truck or a pallet truck. However, it is also conceivable that an upper frame 22 is embodied so as to be so stable and/or has at least one eyelet 23 that the depalletizing device 1 can be lifted by means of a hook of a pulley block, for example of a crane, that engages in the upper frame 22 or in the eyelet 23, for example. The depalletizing device 1 upon being lifted is capable of being transported, that is to say that the depalletizing device 1 is capable of being moved to another location, in particular an operating site. This means that a respective storage surface 4 does not exclusively have to be moved to the depalletizing device 1 but that it is alternatively or additionally also possible for the depalletizing 1 to be moved to a storage surface 4 to be unloaded.

In order to be able to take the depalletizing device 1 to another location, or an operating site, respectively, in a particularly simple manner, the frame 2 can have a floor castor unit 24. For example, the floor castor unit 24 can have at least two, preferably four, rotatable floor contact elements 25 which can in each case be configured as a wheel, for example. On account thereof it is possible for the depalletizing device 1 to be moved to another location without using any further auxiliary means, for example a material handling truck.

Figure 2:
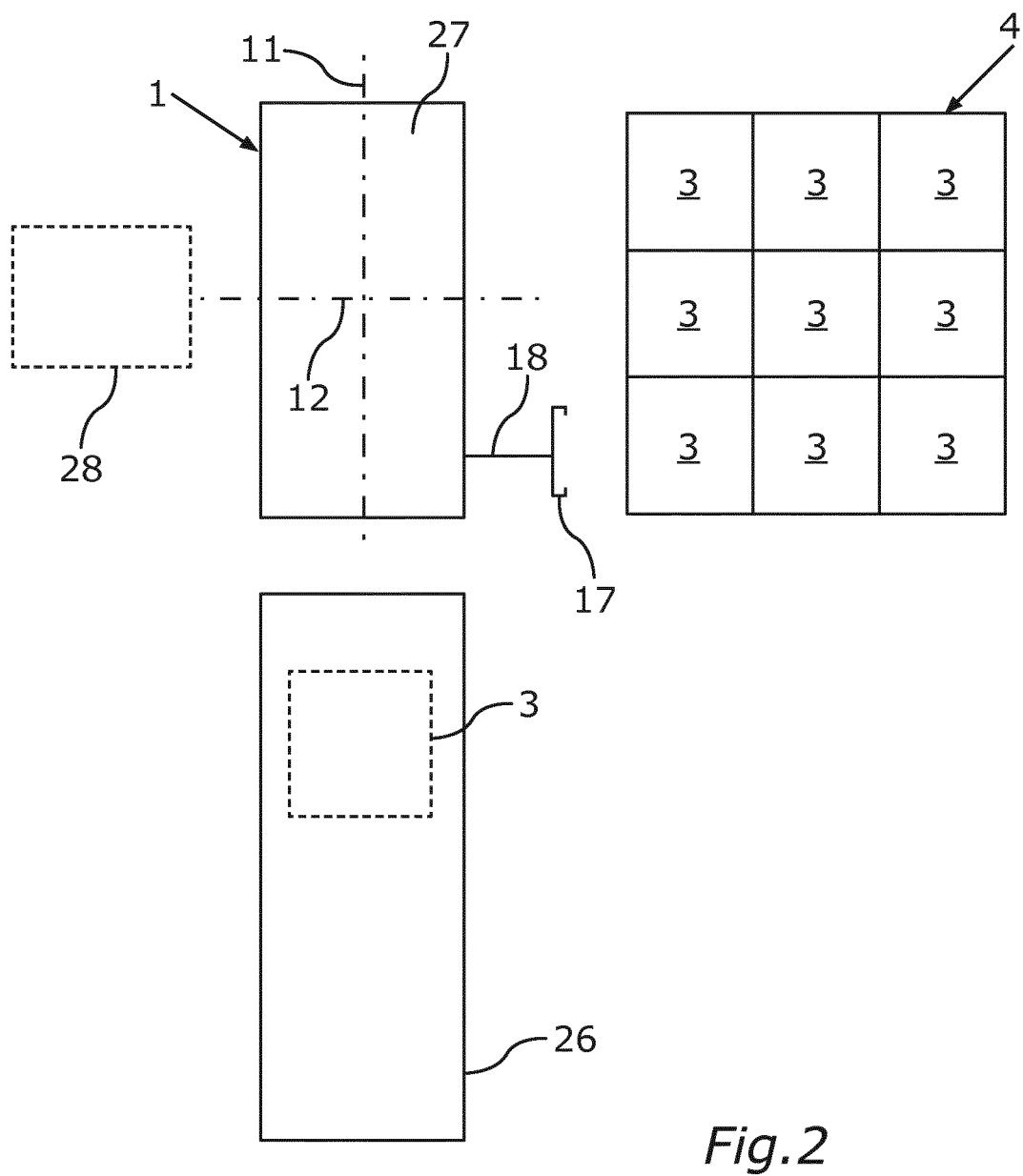
FIG. 2 shows a schematic plan view of the depalletizing device.

FIG. 2 in a schematic plan view shows the depalletizing device 1 such as the latter in an exemplary manner can be used in an inward goods department of a warehouse. To this end, the depalletizing device 1 in relation to the storage surface 4 is aligned such that transport containers 3 placed on the storage surface 4 can be reached by the depalletizing device 1, in particular by means of the gripper 17 thereof. The depalletizing device 1 is ideally aligned in relation to a connecting warehouse structure, for example an entry belt conveyor 26 of the warehouse. The transport container 3 is capable of being gripped and lifted by means of the gripper 17 in that the transport container 3, and the belt conveyor unit 5, respectively, are capable of being lifted by means of the height-adjustment installation 6. On account of the gripper 17 which is advantageously configured as a suction gripper being movable in a linear manner parallel to the longitudinal axis 12 by way of the gripper arm 18, the transport container 3 which is reversibly connected to the gripper 17 is likewise movable in a linear manner parallel to the longitudinal axis 12. On account thereof, the transport container 3 is in particular capable of being moved into an internal region 27. Since the belt conveyor unit 5, respectively the conveyor belt 9 and the balls 13 which form the bearing face, are disposed in the internal region 27, the transport container 3 is capable of being placed on the belt conveyor unit 5 in the internal region 27. When required, it is possible for a position of the transport container 3 in the internal region 27 of the depalletizing device 1 to be changed. For example, the transport container 3 is movable in a translatory manner parallel to the longitudinal axis 12 in that the conveyor belt 9 is drivable by way of the rollers 10 by means of the drive unit 7. Furthermore, the transport container 3 in the internal region 27 of the depalletizing device 1 is movable in a translatory manner parallel to the transverse axis 11 in that at least part of the balls 13 is rotatable by means of the drive unit 7. The transport container 3 is in particular rotatable about the vertical axis 8, which is perpendicular to the image plane of FIG. 2, in that at least part of the balls 13 by means of the drive unit 7 are rotatable preferably in a mutually independent manner in at least two directions, that is to say about the first, the second, and the third rotation axis, as has been described above. The transport container 3 is thus capable of being moved to a desired position within the internal region 27 of the depalletizing device 1.

Transport container 3 which has been moved to the desired position in the internal region 27 of the depalletizing device 1 is capable of being transferred to a connecting warehouse structure. For example, the transport container 3 is capable of being transferred to an entry belt conveyor 26, or capable of being placed thereon. To this end, the transport container 3, in particular by means of part of the balls 13, is movable parallel to the transverse axis 11. A spacing between the depalletizing device 1 and the entry belt conveyor 26 is illustrated in FIG. 2 purely for the purpose of clarity. An upper lead of the entry belt conveyor 26 ideally and realistically is directly contiguous to the upper lead 14 of the belt conveyor unit 5. In that the transport container 3 by means of the balls is capable of being pushed from the upper lead 14 of the belt conveyor unit 5, or of the conveyor belt 9, respectively, the transport container 3 is capable of being pushed onto the upper lead of the entry belt conveyor 26.

Alternatively however, it is also conceivable that the transport container 3 by means of the depalletizing device 1 is capable of being conveyed along the longitudinal axis 12 such that the transport container 3 is capable of being transferred to a further entry belt conveyor 28 which in a manner parallel to the longitudinal axis 12 adjoins the depalletizing device 1.

FIG. 2 furthermore shows a transport container 3 which is illustrated in dashed lines and which by means of the depalletizing device 1 has been unloaded from the storage surface 4 and has been transferred to the entry belt conveyor 26. The transport container that has been depalletized by means of the depalletizing device 1 can be fed to subsequent further treatment by means of the entry belt conveyor 26.

LIST OF REFERENCE CHARACTERS

1 Depalletizing device
2 Frame
3 Transport container
4 Storage surface
5 Belt conveyor unit
6 Height adjustment installation
7 Drive unit
8 Vertical axis
9 Conveyor belt
10 Roller
11 Transverse axis
12 Longitudinal axis
13 Ball
14 Upper lead
15 Lower lead
16 Gripper unit
17 Gripper
18 Gripper arm
19 Camera
20 Control installation
21 Lower base
22 Upper frame
23 Eyelet
24 Floor castor unit
25 Floor contact element
26 Entry belt conveyor
27 Internal region The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A depalletizing device for depalletizing a transport container from a storage surface, comprising:
   a frame;
   a belt conveyor unit, wherein the belt conveyor unit has a conveyor belt which is movable via rollers;
   a height-adjustment installation;
   a drive unit;
   wherein the belt conveyor unit, the height-adjustment installation, and the drive unit are disposed entirely within the frame;
   wherein the belt conveyor unit is disposed so as to be height-adjustable on the frame by the height-adjustment installation; and
   a plurality of balls, wherein the plurality of balls are integrated in and protrude from the belt conveyor unit and wherein the plurality of balls form a bearing face for the transport container;
   wherein the drive unit is formed by a single motor and wherein a motion work of the single motor is fed to the height-adjustment mechanism, the rollers, and the plurality of balls to drive the height-adjustment mechanism, the rollers, and the plurality of balls;
   wherein the plurality of balls are simultaneously rotatable in two directions by the drive unit.

2. The depalletizing device according to claim 1 further comprising a gripper unit having a gripper, wherein the transport container disposed on the storage surface is grippable by the gripper and is placeable onto the belt conveyor unit by the gripper.

3. The depalletizing device according to claim 2, wherein the gripper is a suction gripper.

4. The depalletizing device according to claim 2, wherein the gripper unit has a gripper arm which is linearly movable and wherein the gripper is disposed on the gripper arm.

5. The depalletizing device according to claim 2 further comprising:
   a camera, wherein position data of the depalletizing device relative to the storage surface is recordable by the camera; and
   a control installation, wherein the drive unit and/or the gripper unit is controllable based on the position data by the control installation.

6. The depalletizing device according to claim 1, wherein the frame has a receptacle for a lifting device of a material handling truck such that the depalletizing device is liftable and transportable by the material handling truck.

7. The depalletizing device according to claim 1 further comprising a floor castor unit disposed on the frame.

8. A method for operating the depalletizing device according to claim 1, comprising the acts of:
   height-adjusting the belt conveyor unit by the height-adjustment installation; and
   rotating the plurality of balls that are integrated in and protrude from the belt conveyor unit.

\* \* \* \* \*